United States Patent
Tanoi

(10) Patent No.: US 7,169,036 B2
(45) Date of Patent: Jan. 30, 2007

(54) VEHICLE AIR CONDITIONING SYSTEM

(75) Inventor: Akira Tanoi, Fujisawa (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/612,931

(22) Filed: Jul. 7, 2003

(65) Prior Publication Data

US 2004/0018812 A1    Jan. 29, 2004

(30) Foreign Application Priority Data

Jul. 29, 2002   (JP)   ............... P 2002-219768

(51) Int. Cl.
*B60S 1/56* (2006.01)
(52) U.S. Cl. ...................... 454/121; 454/144
(58) Field of Classification Search ............... 454/121, 454/144, 124, 125, 126, 155
See application file for complete search history.

(56) References Cited

U.S. PATENT DOCUMENTS

| | | | | |
|---|---|---|---|---|
| 2,984,415 | A * | 5/1961 | Wilfert | 237/12.3 A |
| 6,062,298 | A * | 5/2000 | Lee | 165/42 |
| 6,247,530 | B1 * | 6/2001 | Mochizuki et al. | 165/204 |
| 6,257,975 | B1 * | 7/2001 | Giez | 454/127 |
| 6,695,691 | B1 * | 2/2004 | Le | 454/156 |

FOREIGN PATENT DOCUMENTS

| | | |
|---|---|---|
| FR | 2 437 312 | 4/1980 |
| GB | 2 311 850 | 10/1997 |
| GB | 2 311 850 A | 10/1997 |
| GB | 2 345 672 | 7/2000 |
| GB | 2 345 672 A | 7/2000 |
| JP | 58-164811 | 11/1983 |
| JP | 06-92135 | 4/1994 |
| JP | 3054908 | 9/1998 |
| JP | 2000-071748 | 7/2000 |
| JP | 2000185543 A * | 7/2000 |
| JP | 2003267047 A * | 9/2003 |

* cited by examiner

*Primary Examiner*—Gregory Wilson
(74) *Attorney, Agent, or Firm*—McDermott Will & Emery LLP

(57) ABSTRACT

A vehicle air conditioning system which includes: an air conditioning unit for generating air-conditioned air, which is provided with a ventilation opening and a defroster opening; a ventilation duct connected to the air conditioning unit at the ventilation opening, which conducts the air-conditioned air to a ventilation outlet; a defroster duct connected to the air conditioning unit at the defroster opening, which conducts the air-conditioned air to a defroster outlet; and an additional duct branching off from the defroster duct, which conducts the air-conditioned air from the defroster duct to an additional outlet.

4 Claims, 5 Drawing Sheets

FRONT ←――――→ REAR

FRONT ← → REAR

FRONT ← → REAR

VEHICLE AIR CONDITIONING SYSTEM

BACKGROUND OF THE INVENTION

1. Field of the Invention

The present invention relates to a vehicle air conditioning system, and more particularly to a vehicle air conditioning system having an additional branch duct such as an upper ventilation duct or a rear ventilation duct.

2. Description of the Related Art

Generally, in a vehicle air conditioning system, air-conditioned air generated in an air conditioning unit (heating and cooling unit) is forced to flow out of unit openings, such as a ventilation opening, defroster opening, or footwell opening, and conducted to outlets, such as a ventilation outlet, defroster outlet, or footwell outlet. Japanese Patent Application Laid-Open No. H6(1994)-92135 discloses a vehicle air conditioning system which has a rear ventilation duct branching off from a ventilation duct to conduct air to a rear ventilation outlet.

SUMMARY OF THE INVENTION

In a vehicle air conditioning system as described above, with a rear ventilation duct branching off from a ventilation duct, a rate of airflow at the ventilation outlet is significantly reduced as air-conditioned air is set to be distributed to both the ventilation outlet and the rear ventilation outlet, detrimentally affecting on the comfort for the front seat occupant.

In consideration of the problem as described above, an object of the present invention is to provide a vehicle air conditioning system which has branch ducts added with minimal affect on the rate of airflow at each outlet.

An aspect of the present invention is a vehicle air conditioning system comprising: an air conditioning unit for generating air-conditioned air, which is provided with a ventilation opening and a defroster opening; a ventilation duct connected to the air conditioning unit at the ventilation opening, which conducts the air-conditioned air to a ventilation outlet; a defroster duct connected to the air conditioning unit at the defroster opening, which conducts the air-conditioned air to a defroster outlet; and an additional duct branching off from the defroster duct, which conducts the air-conditioned air from the defroster duct to an additional outlet.

BRIEF DESCRIPTION OF THE DRAWINGS

The invention will now be described with reference to the accompanying drawings wherein.

DETAILED DESCRIPTION OF THE PREFERRED EMBODIMENTS

Embodiments of the present invention will be explained below with reference to the drawings. FIGS. 1 to 4 relate to the vehicle air conditioning system according to the first embodiment of the present invention. FIG. 5 relates to the vehicle air conditioning system according to the second embodiment of the present invention.

[First Embodiment]

The vehicle air conditioning system according to the first embodiment employs an upper ventilation duct as an additional branch duct.

Figure 1:
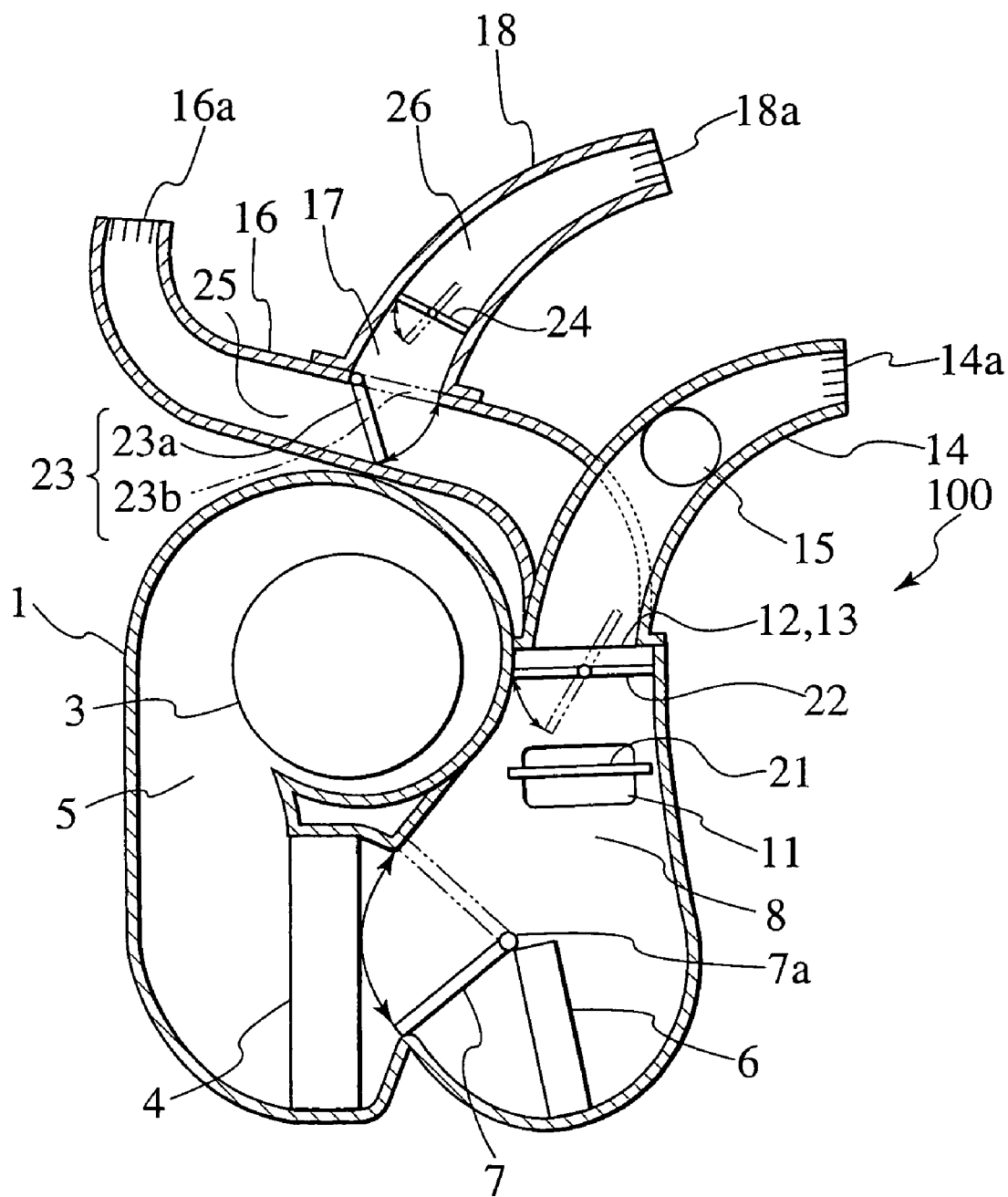
FIG. 1 is a cross-sectional side view of an air conditioning unit of a vehicle air conditioning system according to a first embodiment.
Figure 2:
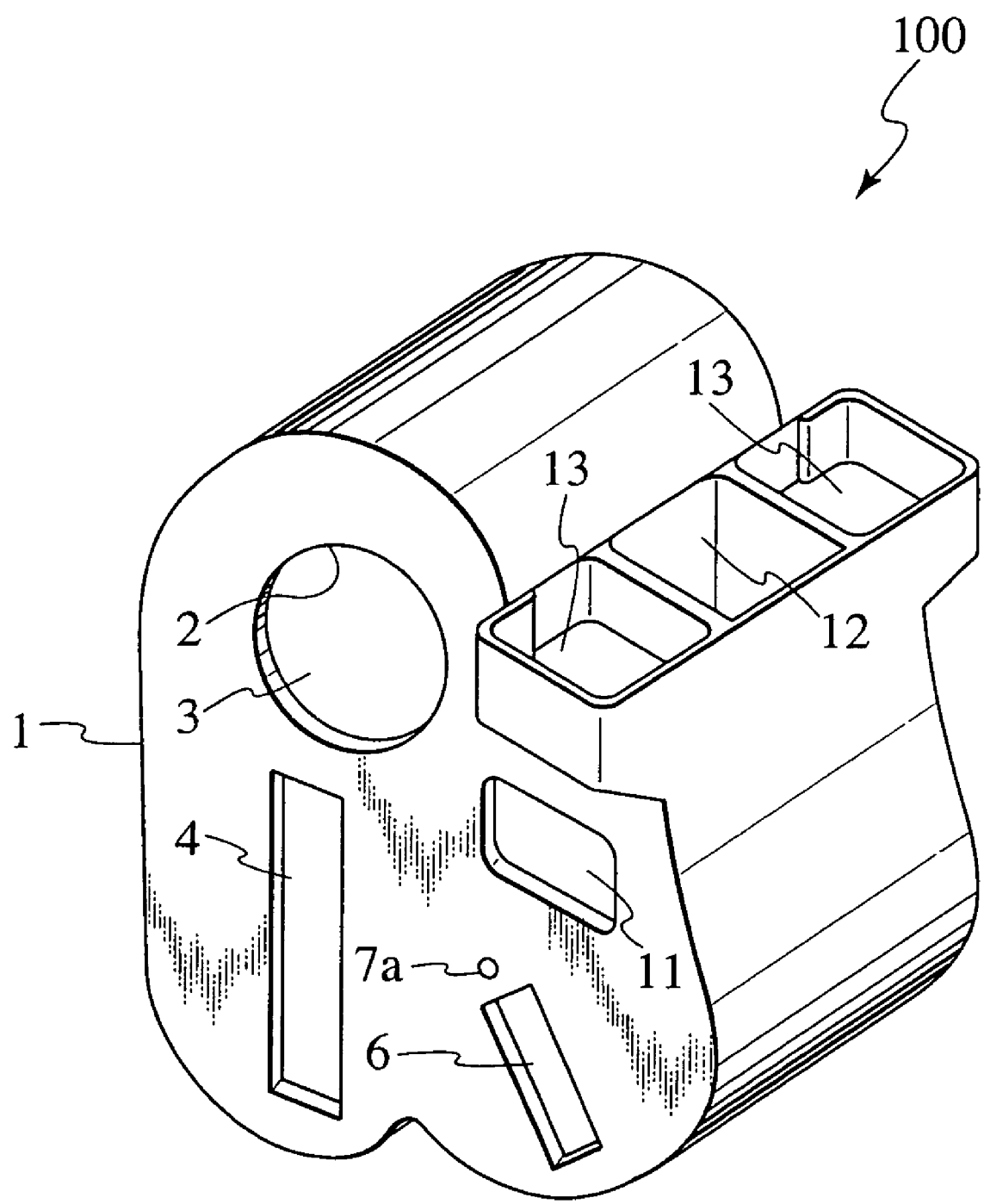
FIG. 2 is a perspective view of the air conditioning unit of FIG. 1.

An air conditioning unit (or a heating and cooling unit) 100 as shown in FIGS. 1 and 2 is placed in a narrow space inside a lower instrument panel in the front of a passenger compartment, whereby the air conditioning unit is necessitated to be compact in size.

The air conditioning unit 100 is constituted of a blower 3, an evaporator 4, a heater core 6, etc. and a casing 1 accommodating these components and defining a passage or a chamber of the air.

The casing 1 is formed to have sidewalls in a vehicle transverse direction. One of the sidewalls is provided with a fresh air intake 2. Air is drawn into the casing 1 through the fresh air intake 2 by rotation of the blower 3. A fresh air/recirculated air switching valve (not shown) is provided upstream of the blower 3. Fresh air or recirculated air is drawn into the casing 1 in response to switching of the fresh air/recirculated air switching valve.

The evaporator 4 is located below the blower 3 and vertically configured. The air taken into the casing 1 is conducted downward through a volute air passage 5 to the evaporator 4 and passes through the evaporator 4 from the front in a vehicle longitudinal direction. When the air passes through the evaporator 4, vaporizing process takes heat required for vaporization of a refrigerant within the evaporator 4 from the air, to thereby cool the air. The heater core 6 is provided downstream and on the rear side of the evaporator 4. On the front face of the heater core 6, an air mixing valve 7 is provided as rotatable about a pivot 7a. In dependence on the opening degree of the air mixing valve 7, the air that has passed through the evaporator 4 passes and/or bypasses the heater core 6. When the cooled air passes through the heater core 6, heat is transferred from hot water within the heater core 6 to the air, thus generating warm air. This warm air and the cooled air that has bypassed the heater core 6 are mixed together in a mix chamber 8 provided above the heater core 6 to generate air-conditioned air.

The casing 1 is provided with footwell openings 11 on respective sidewalls of the mix chamber 8. Above the mix chamber 8, the casing 1 is provided with a defroster opening 12 and a pair of ventilation openings 13 on outer sides of the defroster opening 12 in the vehicle transverse direction. Footwell dampers 21 for opening and closing the footwell openings 11 are provided as rotatable at the footwell openings 11. Ventilation dampers 22 for opening and closing the ventilation openings 13 are provided as rotatable at the ventilation openings 13.

To the openings provided on the casing 1, the ducts for conducting air to the outlets are connected. To the ventilation openings 13, ventilation ducts 14 are connected. The other ends of the ventilation duct 14 are connected to center ventilation outlets 14a provided on the center part of the instrument panel. The ventilation ducts 14 are provided side ventilation openings 15 on their transversely outer sides. Ducts (not shown) are connected to the side ventilation openings 15, and to side ventilation outlets (not shown) provided on both transversely outer sides of the instrument panel. At the center ventilation outlets 14a and the side ventilation outlets, shut valves are provided by which these outlets are manually opened or closed.

To each of the footwell openings 11, duct (not shown) extended to respective footwell outlets (not shown) is connected. The footwell outlets are provided in the vicinity of lower legs and feet of the front seat occupant. To the defroster opening 12, a defroster duct 16 is connected. The other end of the defroster duct 16 is connected to the defroster outlet 16a provided along the lower end of a windshield. The defroster duct 16 is provided an upper ventilation opening 17 on the middle portion of the defroster duct 16. To this upper ventilation opening 17, an upper ventilation duct 18 is connected to branch off from the defroster duct 16. The other end of the upper ventilation duct 18 is connected to an upper ventilation outlet 18a, which is provided on the central portion of the upper surface of the instrument panel, located between the defroster outlet 16a and the center ventilation outlets 14a.

At a branching portion of the upper ventilation duct 18, where the upper ventilation duct 18 branches off from the defroster duct 16, a switching damper 23 is provided. The switching damper 23 is rotated to either the position 23a or the position 23b in response to the operation of selection switches 31 later described. At the position 23a, the upper ventilation opening 17 is opened and a defroster duct passage 25 in the defroster duct 16 is closed. At the position 23b, the defroster duct passage 25 is opened and the upper ventilation opening 17 is closed. In the middle portion of the upper ventilation duct 18, an open/close damper 24 is provided, which is rotated in response to the operations of the selection switches 31 to open or close an upper ventilation duct passage 26 in the upper ventilation duct 18.

Figure 3:
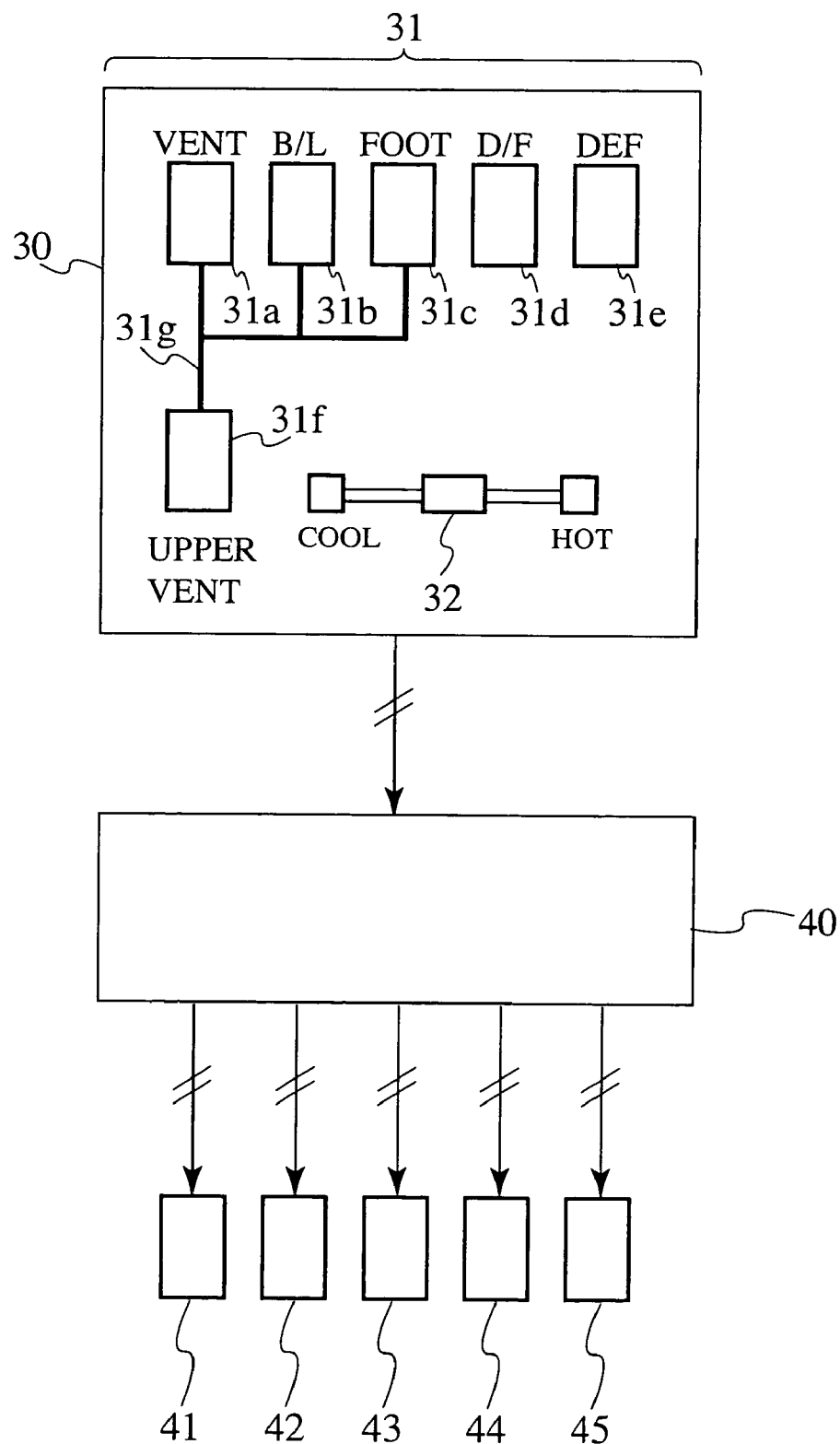
FIG. 3 shows a control panel of the vehicle air conditioning system according to the first embodiment.

FIG. 3 shows a part of a control panel 30 for controlling air-conditioning, which is provided with push-type selection switches 31 for selecting an air distribution mode and a sliding temperature adjuster 32 for setting a target temperature. The selection switches 31 includes: VENT switch 31a for selecting a ventilation mode; B/L switch 31b for selecting a bi-level mode; FOOT switch 31c for selecting a footwell mode; D/F switch 31d for selecting a defroster/footwell mode; DEF switch 31e for selecting a defroster mode; and UPPER VENT switch 31f for selecting an upper ventilation mode.

The upper ventilation mode can be selected only when the ventilation mode, bi-level mode, or foot mode is selected. This condition is indicated by a line 31g which is drawn on the control panel 30 in FIG. 3 to connect each of the VENT switch 31a, B/L switch 31b and FOOT switch 31c to the UPPER VENT switch 31f. The switches 31a to 31e other than the UPPER VENT switch 31f are selectively operated. If any one of the switches 31a to 31e is operated, only the operated switch is turned on, whereas the rest of the switches including the one that has been turned on by then are turned off. Also provided in the control panel 30 are, though not shown in the drawings, an on/off switch which provides an on/off command to the air conditioning system, a fresh air/recirculated air switch which provides a command to the fresh air/recirculated air switching valve, a switch for controlling the rotation speed of the blower, and the like.

Signals from the selection switches 31 and the sliding temperature adjuster 32 are inputted into an air conditioning control unit 40. Receiving a signal from the sliding temperature adjuster 32, the air conditioning control unit 40 outputs a control signal to an actuator 41 for driving the air mixing valve 7. Receiving signals from selection switches 31, the air conditioning control unit 40 also outputs control signals respectively to an actuator 42 for driving the footwell dampers 21, an actuator 43 for driving the ventilation dampers 22, an actuator 44 for driving a switching damper 23, and an actuator 45 for driving an open/close damper 24. The air mixing valve 7 is thus rotated in response to the operation of the sliding temperature adjuster 32, and the dampers 21 to 24 are rotated in response to the operations of the selection switches 31.

Figure 4:
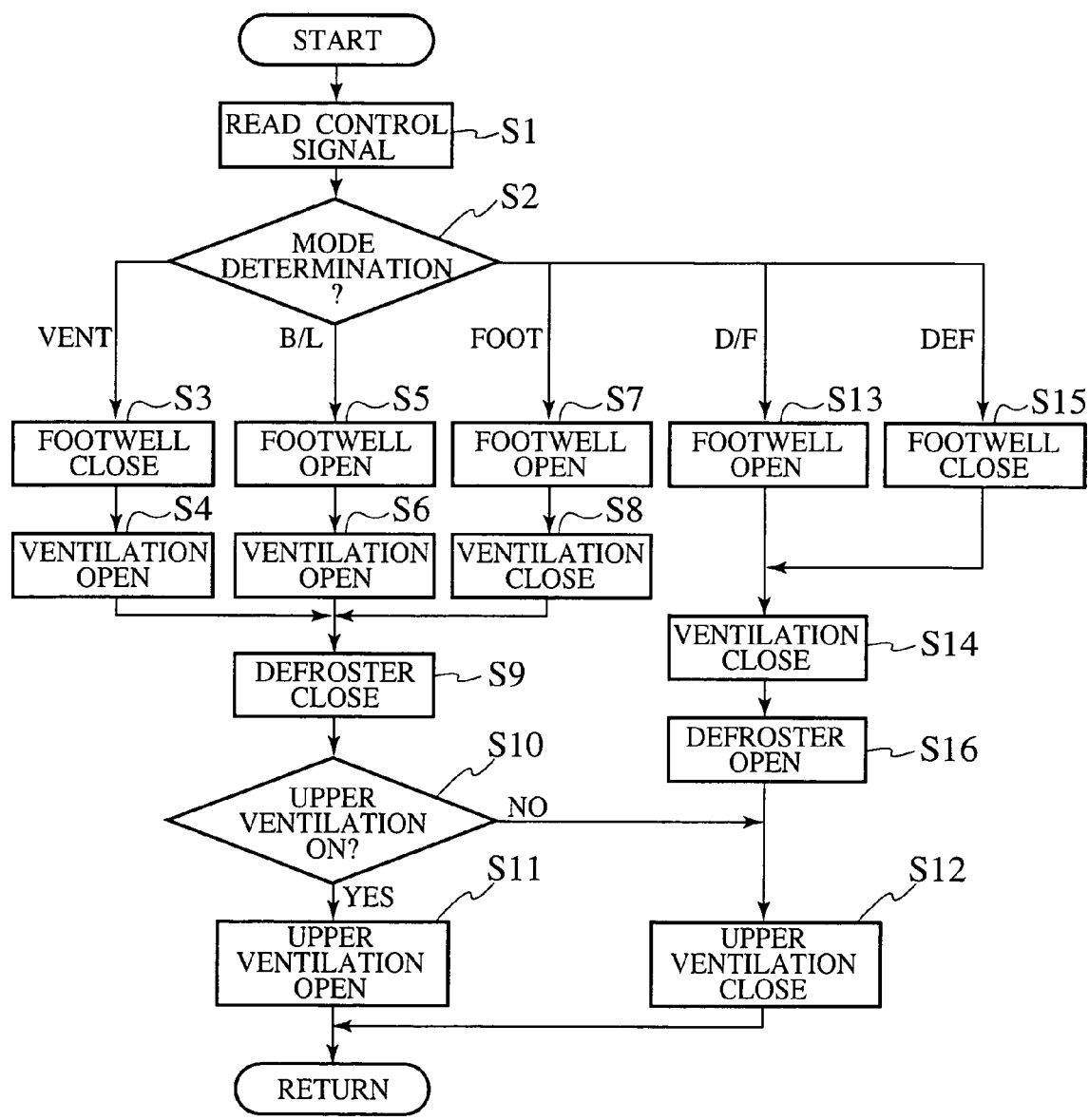
FIG. 4 is a process flowchart of an air conditioning control unit.
Figure 5:
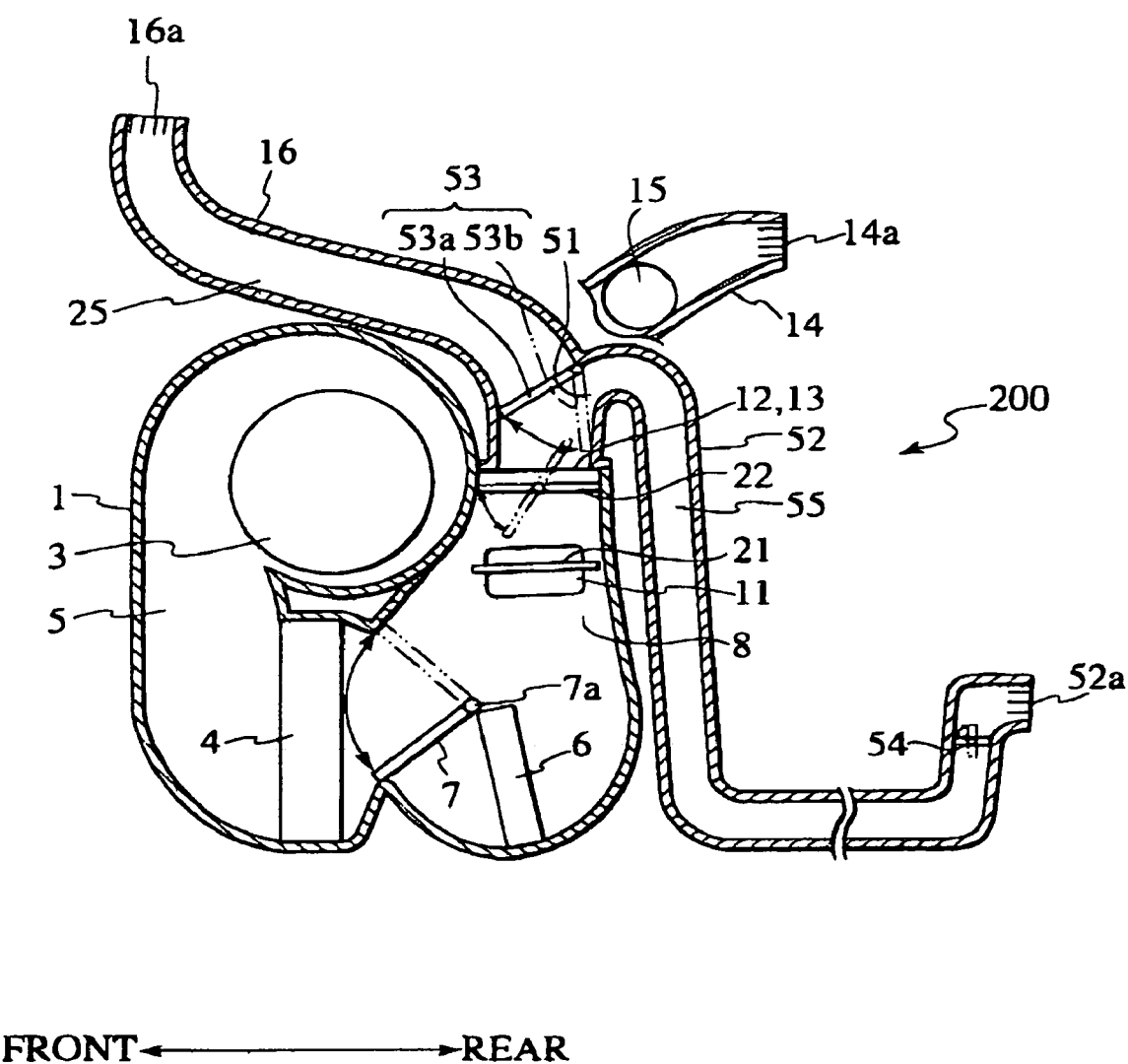
FIG. 5 is a cross-sectional side view of an air conditioning unit of the vehicle air conditioning system according to a second embodiment.

FIG. 4 shows a process flowchart of the control for the dampers 21 to 24 executed in the air conditioning control unit 40. First, in step S1, signals from the selection switches 31 are read. Then, in step S2 of judgment, an air distribution mode is determined based on the read signals from the selection switches 31.

When it is judged that the VENT switch 31a is turned on, the process proceeds to step S3, in which a control signal is outputted to the actuator 42 for driving the footwell dampers 21 to close the footwell openings 11, and to step S4, in which a control signal is outputted to the actuator 43 for driving the ventilation dampers 22 to open the ventilation openings 13. When it is judged that the B/L switch 31b is turned on in step S2, the process proceeds to step S5, in which a control signal is outputted to the actuator 42 to open the footwell openings 11, and to step S6, in which a control signal is outputted to the actuator 43 to open the ventilation openings 13. When it is judged that the FOOT switch 31c is turned on in step S2, the process proceeds to step S7, in which a control signal is outputted to the actuator 42 to open the footwell openings 11, and to step S8, in which a control signal is outputted to the actuator 43 to close the ventilation openings 13. The opening degree of the footwell openings 11 in step S5 is set, by the dampers 21, smaller than that of the footwell openings 11 in step 7. The opening degree of the ventilation openings 13 in step S6 is set, by the dampers 22, smaller than that of the ventilation openings 13 in step S4.

Next, in step S9, a control signal is outputted to the actuator 44 to rotate the switching damper 23 to the position 23a, to thereby close the defroster duct passage 25 and open the upper ventilation opening 17. In step S10, it is judged whether the UPPER VENT switch 31f is turned on. If the UPPER VENT switch 31f is turned on, the process proceeds to step S11, in which a control signal is outputted to the actuator 45 for driving the open/close damper 24 to open the upper ventilation duct passage 26. If the UPPER VENT switch 31f is judged that it is turned off, the process proceeds to step S12, in which a control signal is outputted to the actuator 45 for driving the open/close damper 24 to close the upper ventilation duct passage 26.

Meanwhile, if it is judged that the D/F switch 31d is turned on, the process proceeds to step S13, in which a control signal is outputted to the actuator 42 for driving the footwell dampers 21 to open the footwell openings 11, and to step S14, in which a control signal is outputted to the actuator 43 for driving the ventilation dampers 22 to close the ventilation openings 13. Furthermore, if it is judged that the DEF switch 31e is turned on in step S2, the process proceeds to step S15, in which a control signal is outputted to the actuator 42 to close the footwell openings 11, and to step 14S, in which the ventilation openings 13 are closed. Next, in step S16, a control signal is outputted to the actuator 44 to rotate the switching damper 23 to the position 23b, to thereby open the defroster duct passage. 25 and close the upper ventilation opening 17. Subsequently, the upper ventilation duct passage 26 is closed in step S12.

Next, description will be made regarding the operations of the vehicle air conditioning system according to the first embodiment of the present invention.

When the sliding temperature adjuster 32 is operated, the air mixing valve 7 is rotated about the pivot 7a by the actuator 41. The angular position of the air mixing valve 7 is adjusted, depending on the travel of the sliding temperature adjuster 32, to a certain point where a predetermined air mixing ratio of an amount of air passing through the heater core 6 to that of air bypassing the same is obtained. Temperature of the air-conditioned air is thus adjusted. If, for example, the VENT switch 31a is turned on and the UPPER VENT switch 31f is turned off at this point, the ventilation openings 13 are opened, and the defroster duct passage 25 and the upper ventilation duct 26 are closed (steps S4, S9 and S12). Accordingly, the air-conditioned air generated in the air conditioning unit 100 is conducted to the center ventilation outlets 14a through the ventilation ducts 14, as well as to the side ventilation outlets through the side ventilation openings 15, and blown towards the occupant's torso.

Alternatively, if the B/L switch 31b is turned on and the UPPER VENT switch 31f is turned off, the footwell openings 11 and the ventilation openings 13 are opened, and the defroster duct passage 25 and the upper ventilation duct passage 26 are closed (steps S5, S6, S9, and S12). Accordingly, the air-conditioned air is conducted to the center ventilation outlets 14a, side ventilation outlets and footwell outlets, respectively, and blown towards the occupant's torso as well as lower legs and feet. Moreover, if the FOOT switch 31c is turned on and the UPPER VENT switch 31f is turned off, the footwell openings 11 are opened, and the defroster duct passage 25 and upper ventilation duct passage 26 are closed (steps S7, S9 and S12). Accordingly, the air-conditioned air is conducted to the footwell outlets and blown towards the occupant's lower legs and feet.

When the UPPER VENT switch 31f is turned on while the VENT switch 31a is turned on, the upper ventilation duct passage 26 is opened (step S11). Accordingly, the air-conditioned air generated in the air conditioning unit 100 is conducted not only to the center ventilation outlets 14a and side ventilation outlets, but also to the upper ventilation outlet 18a through the defroster duct 16 and upper ventilation duct 18, and blown towards the upper rear of the passenger compartment. The air-conditioned air blown from the upper ventilation outlet 18a is thus distributed, through the upper passenger compartment, to the rear seat, which enables the quick adjustment of a temperature in the entire passenger compartment.

In this case, the air-conditioned air from the air conditioning unit 100 is forced to flow out of the respective ventilation openings 13 and defroster opening 12, and is conducted to the center ventilation outlets 14a and upper ventilation outlet 18a through the mutually independent ducts 14, 16 and 18. In comparison with the case where the upper ventilation duct 18 is branched off from the ventilation duct 14 and the air-conditioned air is flown only out of the ventilation openings 13, the airflow resistance imposed by the duct system is reduced, and the rates of airflow are increased at the center ventilation outlets 14a and upper ventilation outlet 18a. It is therefore feasible to limit a decrease in the rate of airflow at the center ventilation outlets 14a, with the upper ventilation duct 18 provided as an additional branch duct.

Furthermore, it is possible to keep the rate of airflow at the center ventilation outlets 14a and that of the side ventilation outlets well balanced, irrespective of whether the air-conditioned air is distributed to the upper ventilation outlet 18a. This is because the upper ventilation duct 18 is not branched off from the ventilation duct 14. Similarly, when the UPPER VENT switch 31f is turned on while either the B/L switch 31b or FOOT switch 31c is turned on, the upper ventilation duct passage 26 is opened (step S11). Since the airflow resistance is also reduced in the bi-level mode, it is possible to limit a decrease in the rate of airflow at the center ventilation outlets 14a.

Meanwhile, when the D/F switch 31d is turned on, the footwell openings 11 and defroster duct passage 25 are respectively opened, and the ventilation openings 13 and upper ventilation duct passage 26 are closed, regardless of whether the UPPER VENT switch 31f is turned on (steps S13, S14, S16 and 512). Accordingly, the air-conditioned air from the air conditioning unit 100 is conducted to each of the footwell outlets and defroster outlet 16a, and then blown towards the occupant's lower legs and feet as well as the windshield, respectively. Also, when the DEF switch 31e is turned on, the defroster duct passage 25 is opened, and the footwell openings 11, ventilation openings 13, and upper ventilation duct passage 26 are closed, regardless of whether the UPPER VENT switch 31f is turned on (steps 515, 514, S16 and S12). Accordingly, the air-conditioned air from the air conditioning unit 100 is conducted only to the defroster outlet 16a and directed to the windshield. As long as the selected air distribution mode includes the defroster outlet 16d as one of the outlets to which the air is distributed, the upper ventilation duct passage 26 is always closed irrespective of the operation of the UPPER VENT switch 31f to block the air flow from the upper ventilation outlet 18a, thus limiting a decrease in the rate of airflow at the defroster outlet 16d or footwell outlets.

According to the first embodiment of the present invention, the following effects can be achieved.

(1) Since the upper ventilation duct 18 branches off from the defroster duct 16, the air-conditioned air from the air conditioning unit 100 is flown out of the respective defroster opening 12 and ventilation openings 13 and is conducted to the center ventilation outlets 14a and upper ventilation outlet 18a through the mutually independent ducts 14, 16 and 18, when the UPPER VENT switch 31f is turned on in the ventilation mode. The airflow resistance imposed by the duct system is reduced, thus limiting a decrease in the rate of airflow at the center ventilation outlets 14a.

(2) The upper ventilation opening 17 is provided on the defroster duct 16, and the upper ventilation duct 18 is connected to the defroster duct 16 at the upper ventilation opening 17. This eliminates the necessity to provide an additional opening at the mix chamber 8, contributing to minimize the size of the air conditioning unit 100.

(3) The switching damper 23 is provided at the branching portion of the upper ventilation duct 18, to alternatively open the defroster duct passage 25 and upper ventilation opening 17. When the air is blown from the defroster outlet 16a, the upper ventilation duct passage 26 to the upper ventilation outlet 18a is blocked, whereby a decrease in the rate of airflow at the defroster outlet 16a is limited.

(4) Since the defroster duct passage 25 and the upper ventilation opening 17 are opened and closed by the switching damper 23 alone, the number of components can be reduced. Also, even if the damper 23 is broken, air can be certainly distributed to any of outlets 16a and 18a.

(5) The upper ventilation duct 18 conducts the air-conditioned air from the defroster duct 16 to the upper ventilation outlet 18a, which is provided on the upper surface of the instrument panel. Therefore, the upper ventilation duct 18 can be formed in a simple shape and simply configured. The upper ventilation duct 18a contributes to quick temperature adjustment of the entire passenger compartment.

(6) Since there is no open/close damper provided at the defroster opening 12 and the opening is always open, there is no damper loss occurs at the defroster opening 12, keeping the airflow resistance of the system low.

(7) Since the open/close damper 24 is provided in the upper ventilation duct passage 26, the airflow to the upper ventilation outlet 18a can be blocked even when the switching damper 23 opens the upper ventilation opening 17.

(8) The switches 31a to 31c and the UPPER VENT switch 31f on the control panel 30 are connected through the line 31g, which visually notifies (indicates) possible combinations of the switches for operating the UPPER VENT switch 31f. This contributes to the elimination of the possible misoperation of the occupant when operating the control panel 30.

[Second Embodiment]

In the first embodiment, the upper vent duct 18 was used as an additional branch duct. In a second embodiment, a rear ventilation duct 52 will be applied as an additional branch duct.

FIG. 5 is a cross-sectional side view showing an air conditioning unit 200 according to the second embodiment of the present invention. The corresponding components to those in FIG. 1 are noted with the same reference numbers, and description hereinafter will be mainly concerned with differences between the two embodiments.

As shown in FIG. 5, the defroster duct 16 is provided on its rear side with a rear ventilation opening 51. A rear ventilation duct 52 is connected to the defroster duct 16 at the rear ventilation opening 51, branching off from the defroster duct 16. The rear ventilation duct 52 is extended along the bottom of the floor towards the rear of a vehicle. The end of the duct 52 is connected to a rear ventilation outlet 52a that is provided at a rear portion of a center console near the rear seat.

A switching damper 53 is provided at the branching portion of the rear ventilation duct 52, and an open/close damper 54 is provided in the rear ventilation duct 52. Similar to the first embodiment, the switching damper 53 is rotated in response to the operations of the selecting switches 31. Specifically, when the VENT, B/L, and FOOT switches 31a to 31c are selectively operated, the switching damper 53 is rotated to the position 53a, whereas the switching damper 53 is rotated to the position 53b when the D/F and DEF switches 31d and 31e are selectively operated. Air-conditioned air from the air conditioning unit 200 is thus selectively conducted through either the defroster duct passage 25 or a rear ventilation duct passage 55.

When using the air conditioning unit 200 of the second embodiment, a REAR VENT switch, although not shown, is provided on the control panel 30 instead of the UPPER VENT switch 31f. By operating this REAR VENT switch, the open/close damper 54 is correspondingly rotated in the similar manner as in the first embodiment. Specifically, when the REAR VENT switch is turned on while one of the switches 31a to 31c is turned on, the open/close damper 54 rotates to open the rear ventilation duct passage 55. When the REAR VENT switch is turned on while one of the switches 31d and 31e is turned on, the rear ventilation duct passage 55 is kept closed regardless of the operation of the REAR VENT switch.

According to the second embodiment of the present invention, since the rear ventilation duct 52 branches off from the defroster duct 16, the air-conditioned air from the air conditioning unit 200 is flown out of the respective defroster opening 12 and ventilation openings 13 and is conducted to the center ventilation outlets 14a and rear ventilation outlet 52a through the mutually independent ducts 14, 16 and 52, when the REAR VENT switch is turned on in the ventilation mode. The airflow resistance imposed by the duct system is reduced, thus limiting a decrease in the rate of airflow at the center ventilation outlets 14a. Moreover, the rear ventilation opening 51 is provided on the defroster duct 16, and the rear ventilation duct 52 is connected to the defroster duct 16 at the rear ventilation opening 51. This eliminates the necessity to provide an additional opening at the mix chamber 8, contributing to minimize the size of the air conditioning unit 200. Since the rear ventilation duct 52 is connected to the rear ventilation opening 51 provided on the rear side of the defroster duct 16 and to the rear ventilation outlet 52a provided at the rear portion of the center console, the rear ventilation duct 52 can be simply configured.

The preferred embodiments described herein are illustrative and not restrictive, and the invention may be practiced or embodied in other ways without departing from the spirit or essential character thereof. In the embodiments, the upper ventilation duct 18 and rear ventilation duct 52 are applied as an additional branch duct. However, other ducts can also be used as an additional branch duct. Although, in the embodiments, switching means is constituted of the switching dampers 23 and 53 and opening/closing means is constituted of open/close dampers 24 and 54, it is possible to provide an open/close damper within the defroster duct passage 25, which cooperates with either the open/close damper 24 or 54 in the respective duct passages 26 and 55 to constitute the switching means. With regard to the footwell dampers 21 and ventilation dampers 22 as the opening/closing means for the ventilation openings, any types of actuators can be used. The present invention can be applied to both a manual air conditioning system in which an opening degree of a mixing valve and selection of outlets are manually set, and an automatic air conditioning system in which the above conditions are automatically adjusted.

The scope of the invention being indicated by the claims, and all variations which come within the meaning of claims are intended to be embraced herein.

The present disclosure relates to subject matter contained in Japanese Patent Application No. 2002-219768, filed on Jul. 29, 2002, the disclosure of which is expressly incorporated herein by reference in its entirety.

What is claimed is:

1. A vehicle air conditioning system comprising:
   an air conditioning unit for generating air-conditioned air, which is provided with a ventilation opening and a defroster opening;
   a ventilation duct connected to the air conditioning unit at the ventilation opening, which conducts the air-conditioned air to a ventilation outlet;
   a defroster duct connected to the air conditioning unit at the defroster opening, which conducts the air-conditioned air to a defroster outlet; and
   an additional duct branching off from the defroster duct, which conducts the air-conditioned air from the defroster duct to an upper ventilation outlet which is provided on an upper surface of an instrument panel to blow the air-conditioned air toward the upper rear of a passenger compartment, only when any one of a ventilation mode, a bi-level mode, and a foot mode is selected.

2. The vehicle air conditioning system according to claim 1, further comprising:
   a switching damper for selectively conducting the air-conditioned air from the defroster duct to either the defroster outlet or the additional outlet.

3. The vehicle air conditioning system according to claim 2, further comprising:
an open/close damper for opening and closing passage of the air-conditioned air of the additional duct.

4. The vehicle air conditioning system according to claim 1, further comprising:
a ventilation damper for opening and closing the ventilation opening of the air conditioning unit, wherein the ventilation damper is controlled to open and close the ventilation opening in dependence on a selected air distribution mode, and wherein
the defroster opening is kept open irrespective of the selected air distribution mode.

* * * * *